Patented Dec. 14, 1937

2,102,235

UNITED STATES PATENT OFFICE

2,102,235

VACCINES AND PROCESS FOR MANUFACTURING VACCINES

Marion Dorset, deceased, late of Washington, D. C., by Virgil Jackson Dorset, administrator, Washington, D. C., assignor to Henry A. Wallace, as Secretary of Agriculture of the United States of America No Drawing. Application January 15, 1936, Serial No. 59,159½

2 Claims. (Cl. 167—80)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment of any royalty thereon.

This invention relates to vaccines and process for manufacturing vaccines.

Certain diseases of man and other animals are self-limiting. Introduction of matter carrying the infection of such a disease into the animal organism in such a manner as to cause an attack of the disease also stimulates the animal organism to produce anti-bodies which oppose the disease-producing effect of the infectious matter upon the organism. As a result of the production of anti-bodies the progress of the disease is mitigated, arrested or terminated. In case the animal survives, these anti-bodies persist in its body for a significant period and therefore afford a significant degree of protection or immunity against another attack of the disease when the animal is again exposed to infection.

In the case of any disease of the nature described above it is theoretically possible to manufacture a substance, technically known as a vaccine, which, when properly administered to an animal, will notably stimulate the production of anti-bodies in its organism without at the same time producing a characteristic attack of the disease itself, although it may produce certain comparatively mild and temporary disturbances. It is well known that the manufacture of vaccines against several diseases has been reduced to practice and that the products are widely and successfully employed. The principle upon which vaccines may be prepared is well understood. Infectious matter in appropriate physical condition is subjected to such treatment, which may be either physical or chemical in nature, or a combination of both, that its power to produce disease is mitigated or destroyed while at the same time its power to stimulate the production of anti-bodies in the animal organism is left comparatively unimpaired. It is further well known that any process that has been proved useful for the manufacture of a vaccine against a specific disease from its specific infectious matter is likely to be useful for the manufacture of a vaccine against some other specific disease from its specific infectious matter, although the optimal conditions of concentration, temperature and time-periods may differ somewhat in different cases. For example, the substance formaldehyde is a well known useful chemical agent for the manufacture of vaccines against several diseases.

The invention deals with a process for preparing vaccines through use of a chemical attenuating agent not hitherto employed for the purpose. It was discovered that the chemical substance hexa-methyl pararosaniline in solution or in the form of a salt thereof is capable of destroying the disease producing power of infectious matter without depriving it of power to stimulate the formation of anti-bodies and to produce immunity against the disease. The invention, therefore, consists simply in treating infectious matter with hexa-methyl pararosaniline in solution or a salt thereof in such strength and for such a time as to rob the material of power to produce disease without seriously impairing its power to bring about immunity. Favorable results have been obtained by employing hog cholera virus, cultures of *Salmonella suipestifer* and cultures of *Brucella abortus* as initial infectious matter. However, here is described in detail only the manufacture of vaccine against hog cholera.

To 5000 parts of virulent defibrinated virus blood drawn from swine sick with hog cholera preferably between the seventh and ninth days, inclusive, after exposure of the swine to disease by appropriate virus injection, is added, with agitation, between 1 and 3 parts of a water-soluble salt of hexa-methyl pararosaniline previously dissolved in water. A convenient salt for the purpose is the hydrochloride, which is commercially available as the dye commonly termed crystal violet. A 1 percent aqueous solution of crystal violet is appropriate. In practice, though this is not an essential part of the process, it is found advantageous to add also about 5 parts of benzophenol, $C_6H_5OH$, best in the form of a strong aqueous solution, in order more certainly to preclude spoilage of the product by bacteria. Other antiseptics might be used. The mixture is kept in an incubator or other storage space preferably at a temperature near 37.5° C. until tests by injection into susceptible swine show that it has become deprived of power to produce disease, which is usually effected within a period of two weeks. The material is then withdrawn from the incubator and is thereafter stored in a reasonably cool place, as in an ordinary refrigerator. It will be understood that sources of virus other than defibrinated blood may be employed, such as citrated or oxalated blood, or appropriate extracts from various other tissues or organs from which virus is obtainable. The temperature of manufacture is not necessarily restricted to near 37.5° C. It may be higher or lower, but in such case it will be found that the period necessary to effect attenuation will be inversely proportional to the temperature maintained.

The vaccine is applied by subcutaneous or intraperitoneal injection into the swine to be protected or immunized. One dose is usually sufficient. The size of the dose will depend upon such factors as the weight and age of the swine and the potency of the particular lot of vaccine. Therefore each lot of vaccine should be tested for potency and the dose correspondingly set or standardized before the vaccine is put to actual use. Additional doses may, however, be subsequently applied. Swine treated with this vaccine do not, as a rule, acquire immunity immediately; however, the immunity becomes firmly established in three weeks. Therefore, in performing the test for potency above referred to, the susceptible swine used in the test are to be left three weeks after vaccine injection before receiving a virus injection in manner and amount sufficient to initiate a severe attack of hog cholera if they had not been protected or immunized by the vaccine.

Having fully disclosed the invention, it is claimed:

1. A process for the manufacture of vaccine against hog cholera which comprises mixing together virulent defibrinated virus blood from swine sick with hog cholera with from 1/50 to 1/17 of its volume of a 1 per cent aqueous solution of crystal violet, and maintaining the mixture at near 37.5° C. for approximately two weeks, until the material becomes incapable of transmitting hog cholera when injected into susceptible swine.

2. A process for the manufacture of vaccine against hog cholera which comprises mixing together virulent defibrinated virus blood from swine sick with hog cholera with from 1/50 to 1/17 of its volume of a 1 per cent aqueous solution of crystal violet, and an antiseptic, and maintaining the mixture at near 37.5° C. for approximately two weeks, until the material becomes incapable of transmitting hog cholera when injected into susceptible swine.

VIRGIL JACKSON DORSET,
*Administrator of the Estate of Marion Dorset, Deceased.*